Patented June 3, 1941

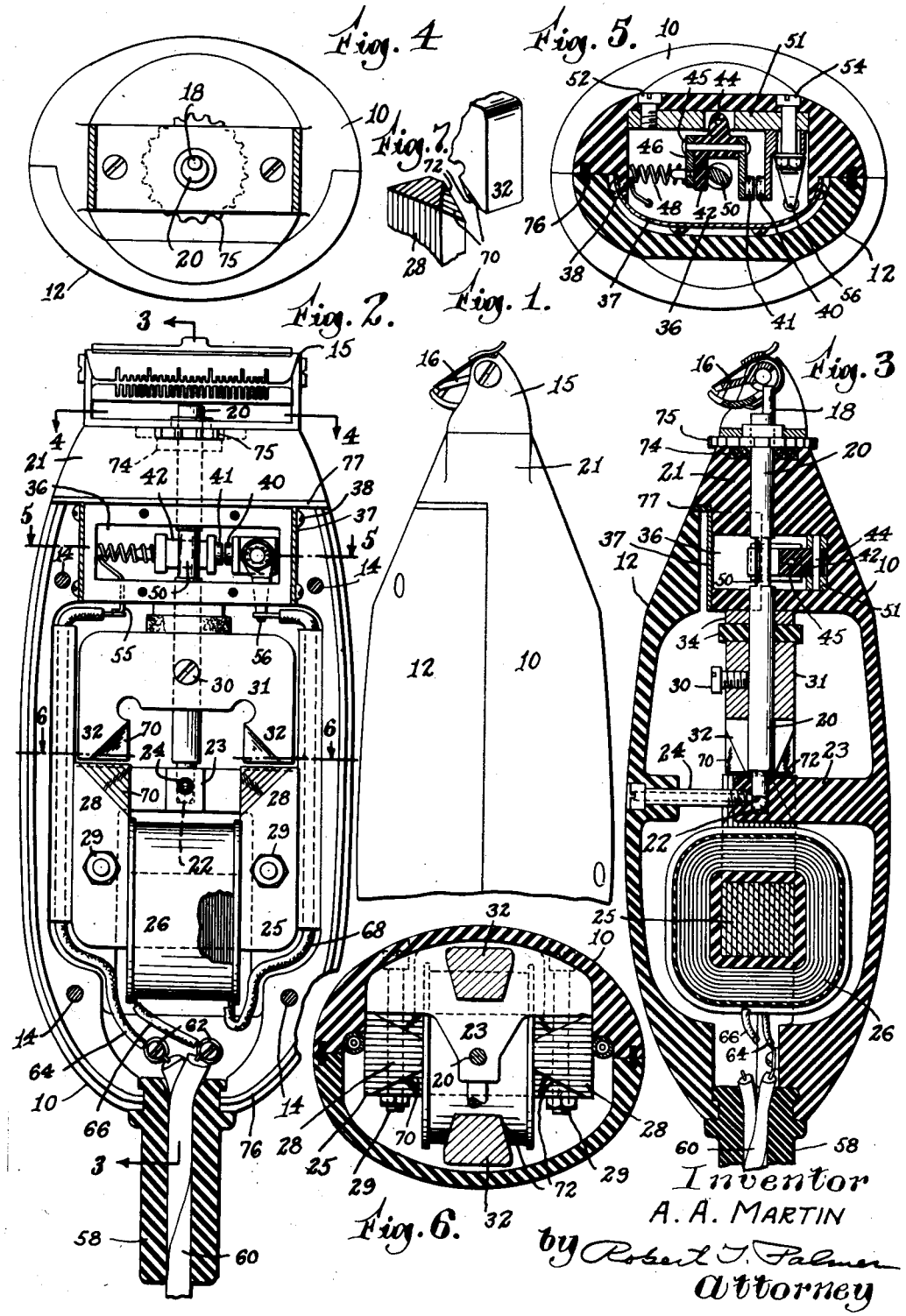

2,243,878

UNITED STATES PATENT OFFICE 2,243,878

MOTOR

Angus A. Martin, Winsted, Conn.

Application August 31, 1938, Serial No. 227,757

11 Claims. (Cl. 172—36)

This invention relates to hair clipping and shaving instruments and more particularly to a motor designed and constructed in a manner especially adapting it to use therewith. Such instruments commonly have the operating motor mounted within the handle of the instrument and one object of my invention is the production of a very compact and efficient motor for this purpose, and more particularly a motor of the make and break type which will operate on both D. C. and A. C. current.

Electric motors have heretofore been commonly constructed with the field magnets located laterally outside of the rotor or armature and such construction requires a very substantial width space within the handle in which the motor is mounted. In accordance with my invention, I propose to mount the rotor in longitudinal alignment with the field and the poles thereof in end to end relation with the field poles, the rotor being mounted to rotate on an axis extending longitudinally of the combined rotor and field and located midway between the poles. Such arrangement greatly reduces the width of mounting space heretofore required and provides a streamlined motor adapted to fit within a handle of like design.

I have found that the strongest pull of a magnet is at its extreme ends, whereby the greatest pulling power is produced by arranging the armature and field poles in end to end relation, but I have also found that such arrangement produces a substantial drag effect on the armature after its poles leave their most effective position relative to the field poles. The magnetic action causing this drag effect appears to take place largely at the inner or shorter radius portions of the poles due to the fact that, the rotary speed or distance traveled by such portions being less than that of the outer portions, the inner portions of the poles remain in close relationship and form a metallic bridge between the poles after the outer portions thereof have become separated. A further and important feature of my invention resides in so constructing the poles as substantially to eliminate this drag, whereby retaining the greater pulling power of the poles in the forward direction while wholly or largely eliminating the opposing magnetic drag, all as hereinafter more specifically described. Such improvement results not only in a more powerful motor but also in a motor having very substantially greater speeds and one in which heating of the field coil is greatly reduced.

As above stated, the streamlined construction of my improved motor particularly adapts it to use in a handle casing for clipping-shaving instruments and the like, and a further feature of the invention resides in sealing the motor within the casing against the ingress of water and also in providing a relatively small closed chamber within the casing for housing the make and break contacts. Since the instrument employing the motor may be used around or with water, the sealing of the motor eliminates motor trouble which might otherwise occur due to moisture, and the housing of the make and break contacts prevents burning of the contacts by eliminating oxygen from the chamber. The production of such an improved and compact motor combination having the parts mounted and operating in a most efficient manner, all as hereinafter more specifically described, comprises a further object of the invention.

These and other features of the invention will be best understood and appreciated from the following description of a preferred embodiment thereof selected for purposes of illustration and shown in the accompanying drawing, in which Fig. 1 is a partial side elevation of a clipping instrument employing my improved motor, Fig. 2 is a front elevation thereof with the cover removed, Fig. 3 is a longitudinal sectional view taken on line 3—3 of Fig. 2, Fig. 4 is a view taken on line 4—4 of Fig. 2 and showing the instrument in front end elevation, Fig. 5 is a sectional view taken on line 5—5 of Fig. 2, Fig. 6 is a sectional view taken on line 6—6 of Fig. 2 but showing the armature rotated 90°, Fig. 7 is a fragmentary view of a detail.

Referring specifically to the drawing by reference characters, 10 and 12 indicate respectively the body and cover of a handle casing for a clipping instrument of the nature shown in my copending application, Serial No. 134,823, filed April 3, 1937, the cover being held to the body 10 by screws 14. The subject matter herein claimed relates to the motor and handle details which are not disclosed or claimed in said copending application. A clipping head 15 is mounted on the forward end of the handle and its clipping blade 16 is adapted to be reciprocating by a crank 18 on the forward end of a motor shaft 20. This shaft extends through a solid end portion 21 of the body 10 and its rear end rests on a thrust ball bearing 22 in a wall 23 integral with the casing. Oil may be supplied to this bearing through a hole drilled through a screw 24.

The motor comprises a laminated U-shaped field magnet 25 having an energizing coil 26 associated therewith between the two poles 28 terminating in end portions, bolts 29 serving to secure the magnet to the casing. Fixed to the shaft 20 by a screw 30 is a U-shaped unwound armature 31 having two poles 32 terminating in end portions and opposing the poles 28 of the magnet in end to end relation, the armature and shaft being held against longitudinal forward movement by spacing washers 34.

The motor illustrated is of the make and break type and one feature of the invention resides in housing the make and break contacts within a substantially airtight chamber whereby eliminating burning effect on the contacts. Such a chamber 36 is provided within the portion 21 of the casing and is covered by a sheet metal strip 37 secured by screws 38. One contact 40 is fixed and the other contact 41 is carried on a member 42 of insulation material pivoted at 44. A metal pin 45 extends through the member 42 and secures the movable contact plate to a plate 46 and provides an electrical connection therebetween. The member is normally pivoted in the contact closing direction by a spring 48 engaging the plate 46, this spring also serving as a part of the electric circuit. The spring normally holds the pivoted member in contact with a cam 50 formed on the shaft 20. The contact members are supported on a plate 51 held in place in the bottom of the chamber 36 by a screw 52, the fixed contact being held by a bolt 54. Terminals 55 and 56 from the contacts extend outwardly through the wall of the chamber and are sealed airtight therein.

A relatively long cord supporting tube 58 is fixed water tight within the rear end of the casing and the electric cord 60 extends therethrough to posts 62. A cable 64 connects one post 62 with the terminal 55. A cable 66 connects the other post 62 with one end of the coil 26, and another cable 68 connects the other end of the coil to the terminal 56.

It will be apparent that the mounting of the armature and field magnet in end to end relation provides a streamlined motor of relatively narrow width adapted to fit within a handle of like design. This end to end relation produces maximum pulling power on the armature which would normally also result in producing a substantial drag thereon after its poles leave their most effective position relative to the field poles. The magnetic action causing this drag effect appears to take place largely at the inner or shorter radius portions of the poles due to the fact that, the rotary speed or distance traveled by such portions being less than that of the outer portions, the inner portions of the poles remain in close relationship after the outer portions thereof have become separated.

In accordance with my invention, I substantially reduce or eliminate this drag by beveling the end portions of the poles, as illustrated at 70, in a direction converging toward the free ends thereof and radially inward toward the shaft 20. The beveling is preferably such that, upon rotation of the armature, the armature poles leave the field poles substantially at the same time along the relatively receding side edges of such poles, i. e., these edges are substantially parallel in such relative position of the poles. As thus constructed the pulling magnetic effect in the forward direction is retained and even increased while the opposing magnetic drag on the armature is wholly or largely eliminated.

This effect may best be understood by reference to Fig. 6 wherein the relation of the field and armature poles 28 and 32 are shown in end view, and also to Fig. 7. It will be appreciated that two cooperating magnets are most effective when they have relatively large parallel surfaces presented to each other and by beveling off the inner corners of the poles as illustrated, such parallel surfaces are provided on the armature and field poles, the cooperating edges 72 of the poles being substantially parallel as the poles 32 approach or recede from the poles 28. Such construction provides maximum pulling power on the armature when the edges 72 approach each other to the most effective pulling position and, furthermore, the cutting or beveling off of the corners of the poles eliminates the drag which would be effective on the armature if such corners were allowed to remain and form a metallic bridge between the poles during a substantial part of the rotation of the armature as the armature poles recede from the field poles. The greater efficiency produced by this improvement results not only in a more powerful motor but also in a motor having very substantially greater speeds and one in which heating of the field coil is greatly reduced.

The instrument illustrated as employing my improved motor may be used for dry clipping or shaving and may also be used with lather or moist shaving. In either case, the instrument may be subjected to water immersion and a further feature of the invention resides in the provision of a construction preventing the ingress of moisture to the motor. To this end, a water-tight gasket 74 is mounted on the shaft 20 beneath the starting disk 75, and water-tight gaskets 76 and 77 are provided between the cover 10 and body 12 along their cooperating edges. Such gaskets, together with the water-tight joint between the tube 58 and the casing, serve effectively to prevent moisture from penetrating into the motor casing.

It will now be apparent that I have produced and herein disclosed a superior product of the nature illustrated and described, and what I claim as new and desire to secure by United States Letters Patent is:

1. An electric motor comprising a field magnet having a plurality of relatively spaced poles extending outwardly therefrom and terminating in end portions, an energizing coil associated with the magnet, an armature having a plurality of relatively spaced poles terminating in end portions opposed to and arranged to cooperate with the end portions of the field poles in end to end relation, the armature being mounted to rotate on an axis located equal distances from the field poles and equal distances from the armature poles and extending longitudinally of the poles, and make and break contacts in the coil circuit under control of the armature rotation, the cooperating end portions of the poles being shaped to leave a substantially uniform spacing between the end portions of the armature poles and the cooperating end portions of the field poles along their side edges as the former approach and recede from the latter upon rotation of the armature.

2. The motor defined in claim 1 in which the magnetic material in the cooperating end portions of the poles gradually increases at the sides thereof from the free ends of the poles rearwardly.

3. The motor defined in claim 1 in which the magnetic material in the cooperating end portions of the poles gradually increases at the sides thereof from the free ends of the poles rearwardly and from the radially inward faces thereof outwardly.

4. The motor defined in claim 1 in which the sides of the end portions of the poles are bevelled in a direction converging toward the free ends thereof.

5. The motor defined in claim 1 in which the sides of the end portions of the poles are bevelled in a direction converging toward the free ends thereof and radially inward toward said axis.

6. An electric motor comprising a laminated U-shaped field magnet having the legs thereof forming two oppositely disposed poles extending outwardly therefrom, an energizing coil associated with the magnet between the poles, a U-shaped unwound armature having the legs thereof forming two oppositely disposed poles opposed to and arranged to cooperate with the field poles in end to end relation, the armature being mounted to rotate on an axis located midway between the poles and extending longitudinally of the poles, and make and break contacts in the coil circuit under control of the armature rotation.

7. The motor defined in claim 6 in which the poles are all equally spaced from said axis and in which the side portions of the poles are bevelled in a direction converging toward the free ends thereof.

8. An electric motor comprising a field coil, a U-shaped field magnet having the intermediate body portion thereof associated with the coil and having the legs thereof projecting outwardly beyond the coil in parallel and spaced relation and providing two poles, a U-shaped unwound armature mounted to rotate on an axis extending between and longitudinally of the poles and having the legs thereof providing two poles extending toward the magnet to a position wherein their ends closely face the ends of the field poles when the armature is rotated to a position in the plane of the magnet, and make and break contacts in the coil circuit under control of the armature rotation.

9. An electric motor comprising an electromagnetic field, a rotary armature cooperating therewith, a casing enclosing the field and armature, make and break contacts in the field circuit, means enclosing the contacts within a relatively small and substantially air tight chamber within the casing, and means including a shaft driven by the armature and extending through the chamber for operating the contacts.

10. An electric motor comprising an electromagnetic field, a rotary armature cooperating therewith, a fixed contact and a cooperating movable contact in the field circuit, a pivoted member carrying the movable contact, a spring acting against the pivoted member in a direction to close the contacts and serving as a portion of said circuit, and means including a shaft driven by the armature for intermittently pivoting said member against the action of the spring.

11. In a device of the class described, a casing having a solid forward end portion and a chamber rearwardly thereof, a motor including an electro-magnetic field magnet and a cooperating armature in the chamber, a shaft rotatably supporting the armature and extending forwardly through said end portion, means preventing leakage into the chamber along the shaft, a cover on the casing enclosing the chamber, a gasket between the casing and cover preventing leakage into the chamber, make and break contacts in the field circuit under control of the armature rotation, and means providing a relatively small closed chamber in the casing between said solid end portion of the casing and the first named chamber, said contacts being within said closed chamber.

ANGUS A. MARTIN.